(12) United States Patent
Morris et al.

(10) Patent No.: US 12,403,730 B2
(45) Date of Patent: Sep. 2, 2025

(54) DETECTING TIRE OR WHEEL THEFT ACTIVITY

(71) Applicant: The Goodyear Tire & Rubber Company, Akron, OH (US)

(72) Inventors: Brian Richard Morris, Canton, OH (US); Mark Robert Milliren, Copley, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 91 days.

(21) Appl. No.: 18/505,277

(22) Filed: Nov. 9, 2023

(65) Prior Publication Data

US 2024/0174033 A1    May 30, 2024

Related U.S. Application Data (60) Provisional application No. 63/385,464, filed on Nov. 30, 2022.

(51) Int. Cl.
*B60C 23/04*      (2006.01)

(52) U.S. Cl.
CPC ...... *B60C 23/0486* (2013.01); *B60C 23/0479* (2013.01)

(58) Field of Classification Search
CPC ............ B60C 23/0486; B60C 23/0479; B60R 25/1004; B60R 25/102; G08B 29/188; G08B 29/186; G08B 13/1654
USPC .......................................................... 340/438
See application file for complete search history.

(56) References Cited

U.S. PATENT DOCUMENTS

| | | | |
|---|---|---|---|
| 7,535,345 B2 * | 5/2009 | Tanaka ................ | B60R 25/1004 200/52 A |
| 8,339,251 B2 | 12/2012 | Roberts, Sr. et al. | |
| 9,649,895 B2 | 5/2017 | Mccormick et al. | |
| 9,669,801 B2 | 6/2017 | Utter et al. | |
| 9,738,254 B2 | 8/2017 | Shigetomi | |
| 10,131,320 B2 | 11/2018 | Schmotzer et al. | |

(Continued)

FOREIGN PATENT DOCUMENTS

| | | | | |
|---|---|---|---|---|
| DE | 102008018016 A1 * | 10/2009 | .......... | B60C 23/008 |
| DE | 102008018016 B4 | 6/2016 | | |

OTHER PUBLICATIONS

Search Report for European Application No. EP23 21 2116 dated Apr. 12, 2024.

*Primary Examiner* — Eric Blount
(74) *Attorney, Agent, or Firm* — Edward T. Kennedy (57) ABSTRACT

Disclosed are various embodiments related to detecting tire theft activity. In one non-limiting example, a vehicle trailer system can include a computing device and a tire sensor. The computing device can be configured to be attached to a semi-trailer and the computing device can include an accelerometer. The tire sensor can be attached to a wheel of the trailer and in data communication with the computing device. The computing device can be configured to at least detect a change in height for a portion of the trailer based at least in part on a measurement from the accelerometer. A pressure loss event can be detected based at least in part on a plurality of pressure measurements meeting a rate loss threshold. A vibration measurement can be identified from the accelerometer. An indication of a theft event can be transmitted to a remote computing device.

18 Claims, 7 Drawing Sheets

(56) References Cited

U.S. PATENT DOCUMENTS

2007/0222564 A1    9/2007  Kobayashi
2015/0314752 A1*  11/2015  Shigetomi ........... B60C 23/0479
                                                340/426.18
2020/0001828 A1    1/2020  Loeffler

* cited by examiner

DETECTING TIRE OR WHEEL THEFT ACTIVITY

BACKGROUND

Semi-tractor trailers are large transportation vehicles that transport a load from a first location to a second location. A semi-tractor trailer unit can represent a semi-tractor vehicle for pulling a semi-trailer, in which the semi-trailer contains the load. In some scenarios, the owner of the semi-tractor vehicle may not own the semi-trailer. The semi-tractor can be used to haul different semi-trailers to various destinations. In some instances, a semi-trailer can be situated at a location waiting for a semi-tractor to arrive and deliver the semi-trailer to another location. After the semi-trailer has been used to deliver the load, the semi-trailer may be stored in a facility until it is needed for another delivery.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DEFINITIONS

"TPMS" means a tire pressure monitoring system, which is an electronic system that measures the internal pressure of a tire and is capable of communicating the pressure to a processor that is mounted on the vehicle and/or is in electronic communication with electronic systems of the vehicle and/or the trailer computing device.

"Tread element" or "traction element" means a rib or a block element defined by a shape having adjacent grooves.

DETAILED DESCRIPTION

The embodiments of the present disclosure relate to systems and methods for identifying tire and tire wheel theft activity. Oftentimes, vehicle owners try to keep their vehicles in safe environments in order to avoid vandalism, theft, and other illegal activity. However, even in safe environments, potential criminal individuals can find creative ways to commit vandalism and theft depending on the unique conditions of a vehicle.

As a non-limiting example, a semi-tractor trailer vehicle can refer to a tractor vehicle that pulls a semi-trailer. The semi-trailer can be used to transport a large array of goods from a first location to a second location. In some instances, the semi-tractor trailer can be vulnerable to tire and tire wheel theft. Thieves may attempt to steal or replace tires or tire wheels from the tractor vehicle and/or the semi-trailer. For example, semi-trailers can be stored separately from the tractor vehicle in a remote location and can be vulnerable to tire theft activity. As another example, drivers of the tractor vehicles may participate in theft activity occurring with trailers. For instance, the driver may provide location information of trailer and information on vulnerable trailers to an individual (e.g., a thief) in order to assist the individual in planning a theft of tires or tire wheels. As such, tires and tire wheels of the tractor vehicles and semi-trailers can be vulnerable to illegal criminal activity because of the unique circumstances related to the use of these vehicles. Accordingly, various embodiments are directed to a need for identifying tire and/or tire wheel theft activity that may arise from semi-tractor vehicles and semi-trailer vehicles. In the following discussion, a general description of the system and its components is provided, followed by a discussion of the operation of the same.

Figure 1A:
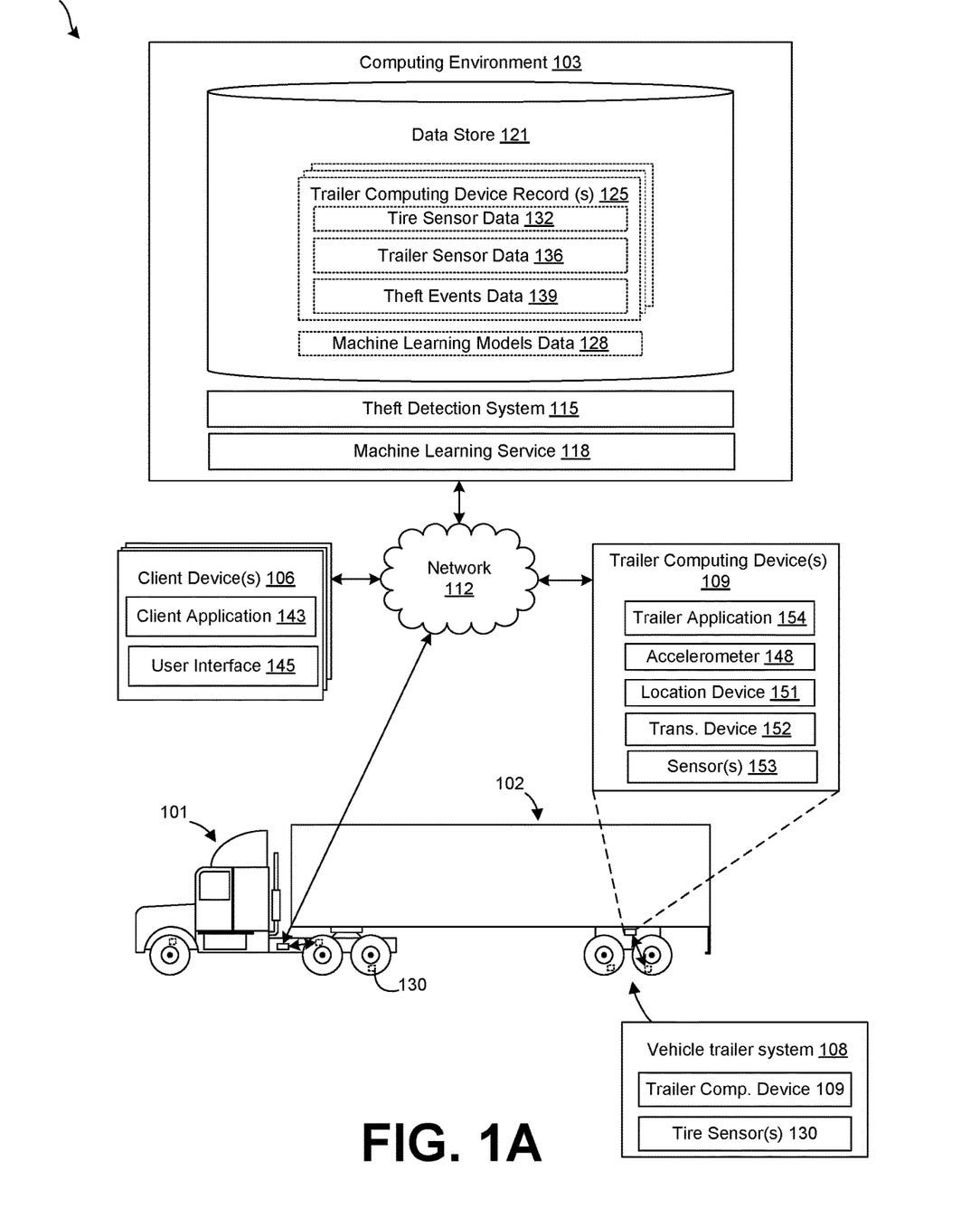
FIG. 1A is a drawing of a network environment according to various embodiments of the present disclosure.

With reference to FIG. 1A, shown is a networked environment 100 for systems and methods related to tire and tire wheel theft activity according to various embodiments. The networked environment 100 can be operated to identify theft activity of a vehicle, such as a tractor 101, a trailer 102, and/or other vehicles. The networked environment 100 includes a computing environment 103, a client device 106, a vehicle trailer system 108, and a trailer computing device 109, which are in data communication with each other via a network 112. The network 112 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 103 may comprise, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. The components executed on the computing environment 103, for example, may include a theft detection system 115, a machine learning service 118, and other applications, services, processes, systems, engines, or functionality not discussed in detail herein. The theft detection system 115 is executed to identify theft activity associated with vehicles (e.g., semi-tractors, semi-trailers, etc.) and other suitable transportation vehicles. The machine learning service 118 is executed to train, deploy, and evaluate machine learning models for the detection of theft activity for tires and/or tire wheels. The machine learning modes can be used by the theft detection system 115 and/or the vehicle trailer system 108.

Also, various data is stored in a data store 121 that is accessible to the computing environment 103. The data store 121 may be representative of a plurality of data stores 121 as can be appreciated. The data stored in the data store 121, for example, is associated with the operation of the various applications and/or functional entities.

The data stored in the data store 121 includes, for example, trailer computing device records 125 and machine learning models data 128, and potentially other data. The trailer computing device records 125 can represent data associated with a particular vehicle trailer system 108 (e.g., trailer computing device 109, the tire sensors 130, etc.). The data for the trailer computing device records 125 can include data provided by the vehicle trailer system 108, derived data generated from the data associated with the vehicle trailer system 108, and other suitable data. The trailer computing device records 125 can include tire sensor data 132, trailer sensor data 136, theft events data 139, and other suitable data.

The tire sensor data 132 can represent data provided a particular tire sensor 130 attached to individual tires of a trailer. The tire sensor data 132 can include a unique identifier for each tire on the trailer 102, a tire position on the trailer 102, temperature measurements, tire pressure measurements, and other suitable data.

The trailer sensor data 136 can represent data associated with other sensor devices, such as an accelerometer, a location device (e.g., Global Positioning System, Global Navigation Satellite Systems), and other suitable sensor devices. The vehicle trailer system 108 can provide the trailer sensor data 136 to the computing environment 103.

The theft events data 139 can represent data associated with theft events and prospective theft events associated with one or more vehicle trailer systems 108. The theft events data 139 can include a time stamp for a theft event, a location for theft event, associated sensor data for the theft event, and other suitable data. The machine learning models data 128 can represent data associated with machine learning models that are trained, deployed, and evaluated for identifying theft activity.

The client device 106 is representative of a plurality of client devices 106 that may be coupled to the network 112. The client device 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 106 may include a display. The display may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 106 may be configured to execute various applications such as a client application 143 and/or other applications. The client application 143 may be executed in a client device 106, for example, to access network content served up by the computing environment 103 and/or other servers, thereby rendering a user interface 145 on the display. To this end, the client application 143 may comprise, for example, a browser, a dedicated application, etc., and the user interface 145 may comprise a network page, an application screen, etc. The client device 106 may be configured to execute applications beyond the client application 143 such as, for example, email applications, social networking applications, word processors, spreadsheets, and/or other applications.

The vehicle trailer system 108 can be a system that is used to identify theft activity. The various components of the vehicle trailer system 108 can be attached to different aspects of a trailer 102. For example, some aspects of the vehicle trailer system 108 can be mounted to various locations on the frame structure of the trailer 102, on various locations on the tractor 101, the tires of the tractor 101, the tires of the trailer 102, and other suitable locations. The vehicle trailer system 108 can include the trailer computing device 109, one or more tire sensors 130, and other suitable components. In some examples, the trailer computing device 109 can be attached to the trailer 102. In other examples, a first trailer computing device 109 can be attached to the tractor 101 and a second trailer computing device 109 can be attached to the trailer 102.

The trailer computing device 109 can be a computing device that is attached to the trailer 102. The trailer computing device 109 can include an accelerometer 148, a location device 151, transceiver device 152, sensor(s) 153, and other suitable devices (e.g., other sensors and communication devices). The trailer computing device 109 can be attached to various locations on the trailer 102, such as near the trailer axles, the trailer frame, the trailer connector, and other suitable locations.

The accelerometer 148 can be used to detect movements in various axes of movement and acceleration. For example, the axes can include an X-axis, a Y-axis, and a Z-axis of a Cartesian coordinate system. Each axis of the Cartesian coordinate system can have an acceleration component and a rotation component of measurement. One or more axes can be used by the trailer computing device 109 to identify theft activity associated with the trailer 102. For example, the accelerometer 148 can be used to detect vibrations which may originate from theft activity. Theft activity may cause vibrations from a powered wrench tool (e.g., an impact gun), a wrench tool (e.g., a crowbar), a hydraulic jack (e.g., an air pressured hydraulic jack), and other suitable theft tools. Additionally, the accelerometer can be used to detect an elevation change of the trailer 102 caused by a hydraulic jack or other theft instruments.

The location device 151 can be used to identify a present location and previous locations (e.g., a location history) of the tractor 101 and/or the trailer 102. A time stamp can be generated for each recorded location of the tractor 101 and/or the trailer 102. The location device 151 may be a GPS device, a Global Navigation Satellite System (GNSS) device, and other suitable location devices.

The transceiver device 152 can be a communication device for data communication via the network 112. The transceiver device 152 can support one or more wireless communication protocols, such as a cellular protocol, a WIFI protocol, Bluetooth protocol, Zigbee protocol, Z-wave, RFID, 6LoWPAN protocol, and other suitable communication protocols.

The sensor 153 can represent other suitable devices that can be used for providing sensor measurement. Some non-limiting examples of sensors can include a microphone, a motion detector, and other suitable sensor devices. For example, a microphone can be used to detect audible sounds of theft activity. The motion detector may be used to detect one or more people in close proximity to particular areas of the trailer 102 (e.g., within a predefined perimeter from the tires of the trailer 102 and/or from the tires of the tractor 101). The sensors 153 can be positioned at various locations on the trailer 102.

The trailer application 154 can be executed to identify theft activity associated with the trailer 102. The trailer application 154 can be in data communication with the computing environment 103 (e.g., theft detection system 115). The trailer application 154 can be used to collect and aggregate sensor data from various sensors (e.g., tire sensors 130, the accelerometer 148, and other sensors 153). In some instances, the trailer application 154 can evaluate the sensor data and determine whether to report a prospective theft event.

The tire sensors 130 can be a device used to provide measurements associated with each individual tire of the trailer 102. The tire sensors 130 can be in wireless data communication with the trailer computing device 109. The tire sensors 130 can provide pressure measurements, temperature measurements, and the suitable measurement. An example of a tire sensor 130 can be a Tire Pressure Measurement System (TPMS). The tire sensors 130 can be mounted on a tire valve stem for the tire wheel and other suitable locations on the tire or tire wheel.

Figure 1B:
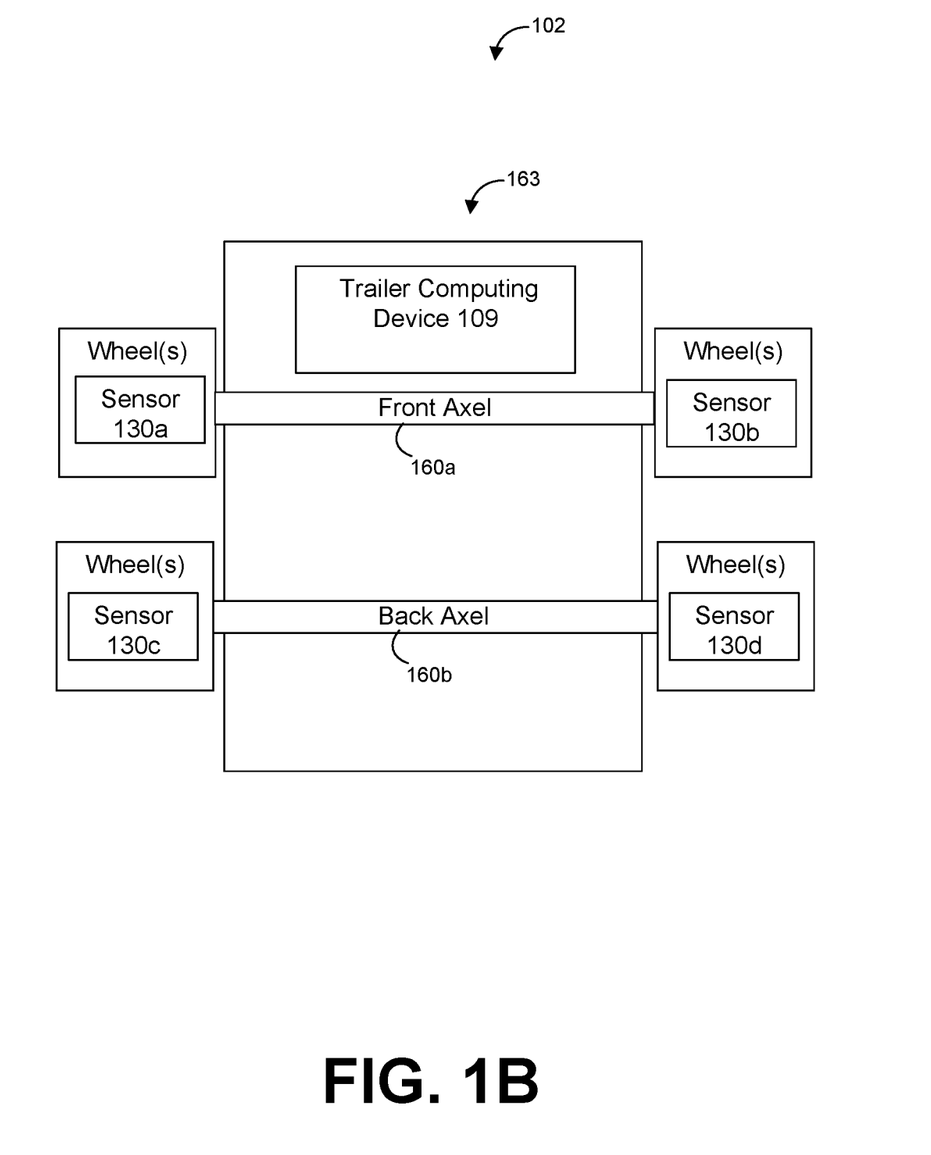
FIG. 1B is a block diagram of a semi-tractor trailer vehicle from FIG. 1A according to various embodiments of the present disclosure.

With reference to FIG. 1B, shown is an exemplary diagram of a portion of the trailer 102 from FIG. 1A. FIG. 1B can represent an underneath view of the trailer 102. The trailer 102 includes a front axel 160a and a back axel 160b (collectively "axels 160"). Although FIG. 1B illustrates two axels, it should be appreciated that there can be more than two axels. Each axel 160 can have one or more wheels on each end of the axel 160. Each tire can have a tire sensor 130a-130d (collectively "tire sensors 130"). Additionally, in the illustrated embodiment, the trailer computing device 109 is mounted closer to the front axel 160a than the back axel 160b. Specifically, the trailer computing device 109 is mounted between the front end 163 and the front axel 160a. The front end 163 of the trailer 102 can be closer to the trailer connector to the tractor 101. In this embodiment, the trailer computing device 109 can be mounted at this particular location in order to provide an appropriate location for the accelerometer 148 to detect vibrations that may occur from each wheel. In another embodiments, the trailer computing device 109 may be mounted in between the front axel 160a and the back axel 160b.

Next, a general description of the operation of the various components of the networked environment 100 is provided. To begin, an instance of identifying tire theft activity can be described. For example, one or more thieves may desire to replace the new tire wheels on a trailer with tire wheels with older tires in order to avoid immediate attention by the owners of the trailer 102 and the driver of the tractor vehicle 101. In this instance, the trailer 102 is equipped with a trailer computing device 109 that monitors sensor data associated with the trailer 102 and communicates the sensor data to a remote computing device (e.g., a computing environment 103) associated with the owner of the trailer 102. The trailer computing device 109 can be in data communication with multiple tire sensors 130, such as TPMS devices, in which each TPMS device measures the internal pressure and temperature of a particular tire.

At an opportune time, thieves begin by lifting the trailer 102 up in order to have clearance for removing the tires or tire wheels. For example, the thieves may use a hydraulic bottle jack for elevating the trailer 102. While the trailer 102 is being elevated by the hydraulic bottle jack, one or more sensors 153 of the trailer computing device 109 may be alerted. For example, a first sensor (e.g., accelerometer 148, motion sensor, etc.) may detect the height change of the trailer 102. A second sensor 153 may detect the audible sounds emitting from an operation of a hydraulic bottle jack. One of more of the sensors 153 may alert the trailer computing device 109 to wake up and check for additional conditions of a prospective theft event.

The trailer computing device 109 can receive additional sensor measurements and determine if the incident should be reported to a remote computing device (e.g., a computing environment 103). In some instances, the trailer computing device 109 can determine the type of theft activity. For example, the trailer computing device 109 may capture vibration measurements that are occurring from a powered wrench tool. The thieves may be using the powered wrench tool to quickly remove the lug nuts from the tire wheel. The vibration measurements can be used to identify a vibration signature that corresponds to a type of theft activity.

As another example, the trailer computing device 109 can receive pressure measurements from the TPMS devices. The pressure measurements can indicate that a rapid loss of pressure is occurring from one or more tires or a loss of data connection to the TPMS devices. These data indicators can represent another indication of a thief activity because of a tire being removed from the tire wheel or the tire wheel being taken. The pressure measurements can be used to identify a pressure loss signature that corresponds to a type of theft activity.

As another example, the trailer computing device 109 may capture vibration measurements that are occurring from a crowbar being used to break a tire seal or pry the tire from the tire wheel. In some instances, the trailer computing device 109 may send these vibration measurements for analysis to identify if the present event is likely a valid theft event and the type of theft event. In other instances, the trailer computing device 109 may perform the analysis of the sensor data and determine valid theft activity itself.

In some examples, the sensor data is provided to the remote computing device (e.g., a computing environment 103) for analysis to identify whether the sensor data represents a valid theft event. The analysis can also be used to generate a heat map of theft activity in a geographic area. The heat map can provide an overlay of different levels of tire theft activity and the types of tire theft activity. The heat map can also be used by an organization (e.g., a company, a government institution, non-profit organization, etc.) to investigate and take action against criminal activity.

Figure 2:
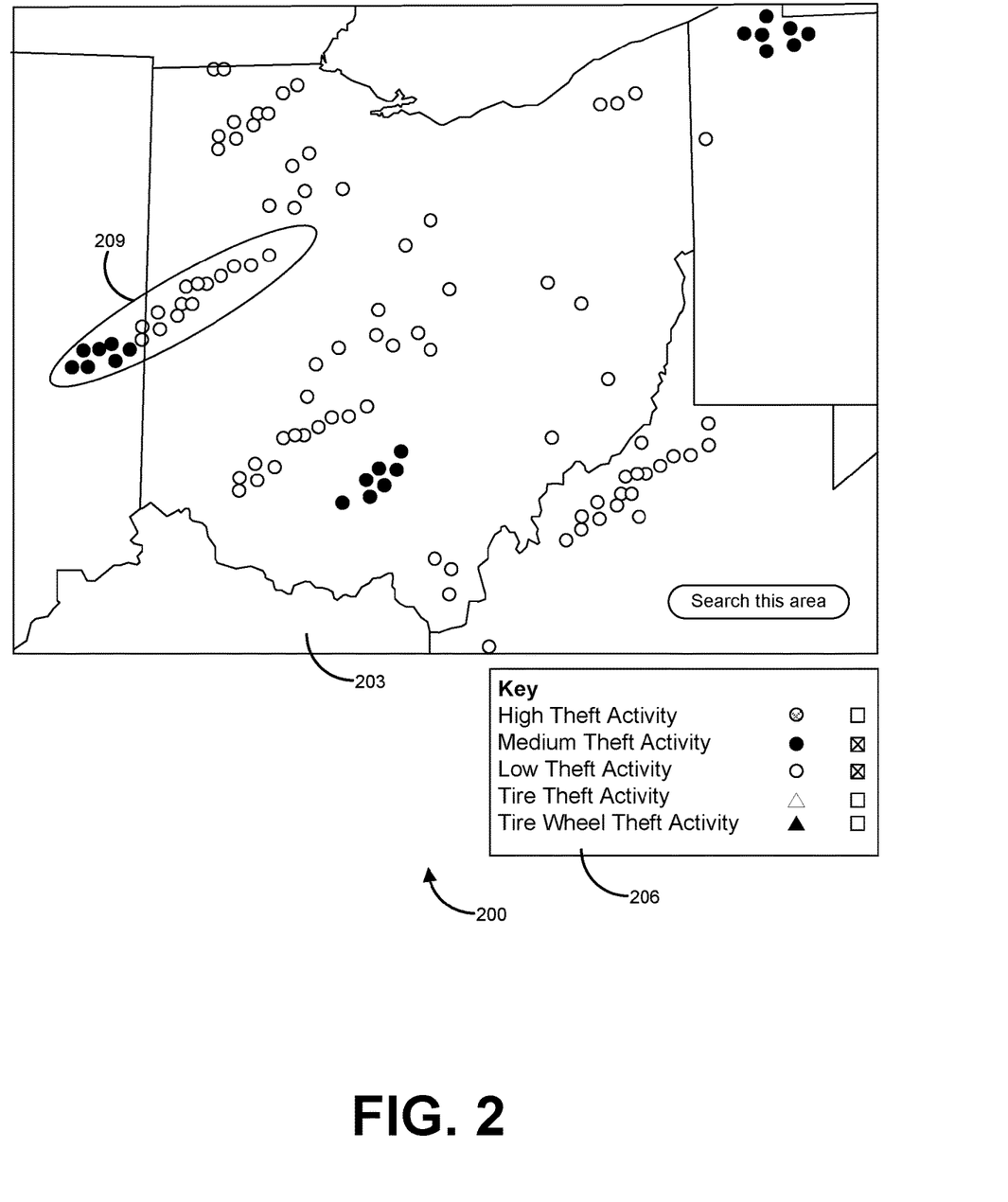
FIG. 2 is a drawing of a heat map in a user interface according to various embodiments of the present disclosure.

Moving on to FIG. 2, shown is an example of a user interface 145 including a heat map 200 that is generated by the theft detection system 115 (FIG. 1). The heat map 200 includes a first interface window 203 of a geographic area and a second interface window 206 of a key. The first interface window 203 illustrates two levels of theft activity (e.g., medium theft activity level and low theft activity level). The different levels of theft activity can be displayed or omitted over the geographic area as an overlayer in response to one or more selections in the second interface window 206 of the key.

The second interface window 206 includes user interface selection elements for each level of theft activity. In response to a selection, an overlayer for the corresponding theft activity level is displayed over the geographic area. In the illustrated embodiment, the low theft activity and the medium theft activity are currently selected. As such, the low theft activity and the medium theft activity overlayers are shown over the geographic area of the state of Ohio. Additionally, the second interface window 206 includes selections for type of theft activity (e.g., tire theft activity and tire wheel theft activity). These selections can provide additional insights to the patterns and habits of individuals responsible for the theft activity.

The heat map 200 can be used to identify and investigate areas of tire and tire wheel theft activity. Based on the heat map 200, a user may decide to further investigate and/or monitor certain areas to identify a source of theft activity. For example, a particular semi-truck driver may be responsible for a series of tire theft activity. In some scenarios, users may adjust settings of the vehicle trailer system 108 or the trailer computing device 109 in order to gather additional data regarding entities involved in the theft activity, such as adjusting sensor settings, activating particular sensors, setup cameras, and other suitable actions.

In some examples, the heat map 200 can highlight theft patterns with a visual indicator 209 (e.g., a circle, an arrow, flashing user interface elements, etc.). The theft detection system 115 can be configured with a set of criteria for identifying one or more patterns. Upon identifying a pattern, the theft detection system 115 can include a visual indicator for the pattern on the heat map 200. Some non-limiting examples of criteria can include the distance between theft events, distance to a trailer storage location, a common attribute among multiple theft events (e.g., same driver, same tractor, same time frame of theft events, etc.), distance to a particular highway, and other suitable conditions.

Figure 3:
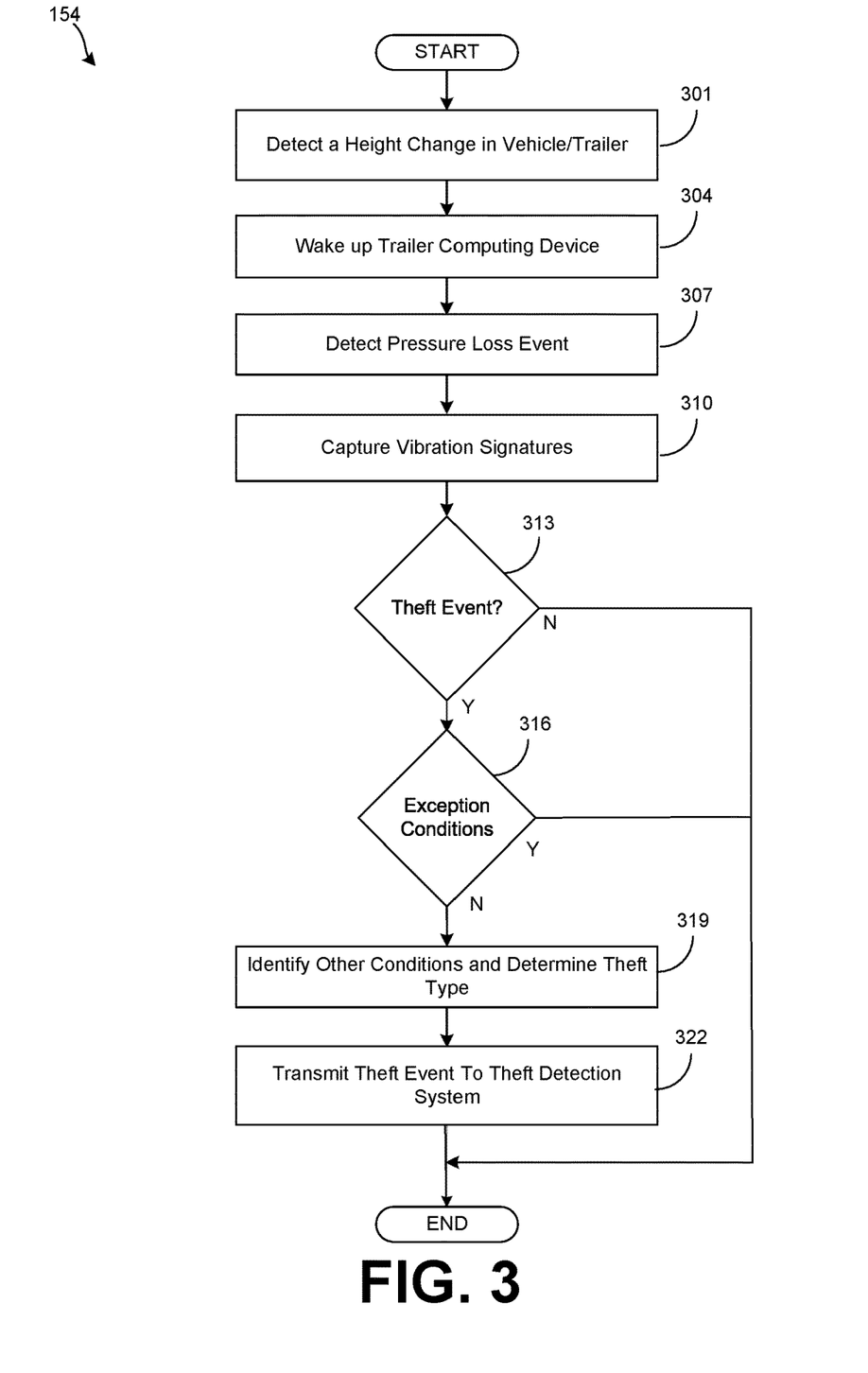
FIG. 3 is a flowchart illustrating one example of functionality implemented as portions of a trailer application executed in a computing environment in the networked environment of FIG. 1A according to various embodiments of the present disclosure.

Referring next to FIG. 3, shown is a flowchart that provides one example of the operation of a portion of the trailer application 154 according to various embodiments. It is understood that the flowchart of FIG. 3 provides merely an example of the many different types of functional arrangements that may be employed to implement the operation of the portion of the trailer application 154 as described herein. As an alternative, the flowchart of FIG. 3 may be viewed as depicting an example of elements of a method implemented in the computing environment 103 (FIG. 1) according to one or more embodiments.

Beginning with box 301, the trailer application 154 can detect a height change in the trailer 102. The height change can be the result of a hydraulic jack lifting the trailer 102 up for removing the tires and/or the tire wheels. In some instances, the height change can be detected by the accelerometer 148 or other sensors 153 (e.g., a motion sensor in situations where the trailer 102 is expected to be stationary). In some embodiments, the detection of the height change is omitted.

In box 304, the trailer application 154 can wake up or activate the trailer computing device 109 from a dormant state. The dormant state can represent an inactive state or a low power mode. In some embodiments, the trailer computing device 109 does not need to be waken. The trailer application 154 can wake up the trailer computing device 109 in order to activate certain components on the trailer computing device 109.

In box 307, the trailer application 154 can detect a pressure loss event. The pressure loss event can include a rapid loss of pressure, a loss of data connection from the tire sensor 130 (e.g., TPMS) to the trailer computing device 109, and other suitable conditions. In some embodiments, the rapid loss of pressure is determined whether it meets a pressure rate threshold or a pressure loss signature in order to validate the rapid loss of pressure as a pressure loss event. The pressure rate threshold or the pressure loss signature can be configured to distinguish a traditional tire leak from a puncture (e.g., from a nail or metal debris).

In box 310, the trailer application 154 can detect or capture vibration measurements. The accelerometer 148 can be used to capture vibrations that originate from the tires, tire wheel and its components, and other areas associated with the structure of the trailer 102. During a theft incident, a thief may use a powered wrench tool to remove the tire wheel, which may involve unscrewing the lug nuts on the tire wheel with the powered wrench tool. Accordingly, the powered wrench tool can cause vibrations that can be detected by the accelerometer 148. The powered wrench tool can cause vibrations that can be identified as having a particular vibration signature.

In another example, the thief may remove the tire from the tire wheel. In order the remove the tire, the thief may use a crowbar or other manual tools. The thief can use these manual tools to pry the tire from the tire wheel, which can cause a different type of vibration. As such, tire theft activity can have a vibration signature that is distinguished from a tire wheel theft event. Accordingly, a first vibration signature can correspond to a theft event of just tires and a second vibration signature can correspond to a tire wheel (e.g., the tire wheel and the tire).

In some instances, a vibration signature for a type of theft activity can correspond to a sequence of a first vibration activity (e.g., a first vibration measurement), a time delay, a second vibration activity (e.g., a second vibration measurement), and other suitable elements.

There are various methods or sequences in which a tire or tire wheel theft event can occur. In one example, a tire theft event may include a unique vibration signature that differs from the tire wheel event. The tire theft event can include capturing a first vibration activity of a theft hitting a sidewall of the tire to loosen the tire from the tire wheel. After the first vibration activity has been finished, a time delay can be noted. Then, a second vibration activity can be captured related to a thief using a crowbar to dislodge or pry an inner perimeter of the tire from the tire wheel. Accordingly, the first vibration activity, the time delay, and the second vibration activity can match a vibration signature for a tire theft event.

As another example, the tire wheel theft event can include a vibration signature related to capturing multiple lug nuts being unscrewed with a powered wrench tool. For instance, eight vibration activities can be detected for eight lug nuts, in which there may be a short time delay between each lug nut being unscrewed. Accordingly, these vibration activities can match a vibration signature for a tire wheel theft event.

In box 313, the trailer application 154 can determine whether to report the prospective theft event based on the pressure loss event data and the vibrations measurements. If the trailer application 154 determines to report the prospective theft, the trailer application can proceed to the box 316. If the trailer application 154 determines not to report the prospective theft, the trailer application 154 can proceed to the end or a dormant state.

In box 316, the trailer application 154 can determine if there any exception conditions for negating the prospective theft event. Some non-limiting examples of exception conditions can include safe locations (e.g., mechanic shop location), scheduled time for routine maintenance (e.g., a time window for maintenance), and other suitable exception conditions.

If the trailer application 154 determines that there are not exception conditions, the trailer application can proceed to the box 319. If the trailer application 154 determines there are exception conditions, the trailer application can proceed to the end or a dormant state. In some instances, the trailer application 154 can log the prospective theft event and the exception conditions for further analysis later.

In box 319, the trailer application 154 can identify other conditions associated with the prospective theft event, such as a time stamp for the prospective theft event, motion measurements, and other suitable conditions. Additionally, the trailer application 154 can determine a theft type for the prospective theft event. For example, the trailer application 154 can distinguish a tire theft event, a tire wheel theft event, and other suitable types of theft events.

In box 322, the trailer application 154 can transmit the prospective theft event data to the theft detection system 115 for theft analysis. The prospective theft event data can include the pressure loss event data, the vibration measurements, the theft type (e.g., tire, tire wheel, or unknown, etc.) and the other conditions, such as the geographic location from the location device 151, a timestamp (e.g., date and time), a number of pressure loss events detected from multiple tires, present movement of the trailer 102, a time duration at the location, and other suitable conditions. Then, the trailer application 154 can proceed to the end or to a dormant state. The dormant state can represent a lower powered mode for the trailer computing device 109.

Figure 4:
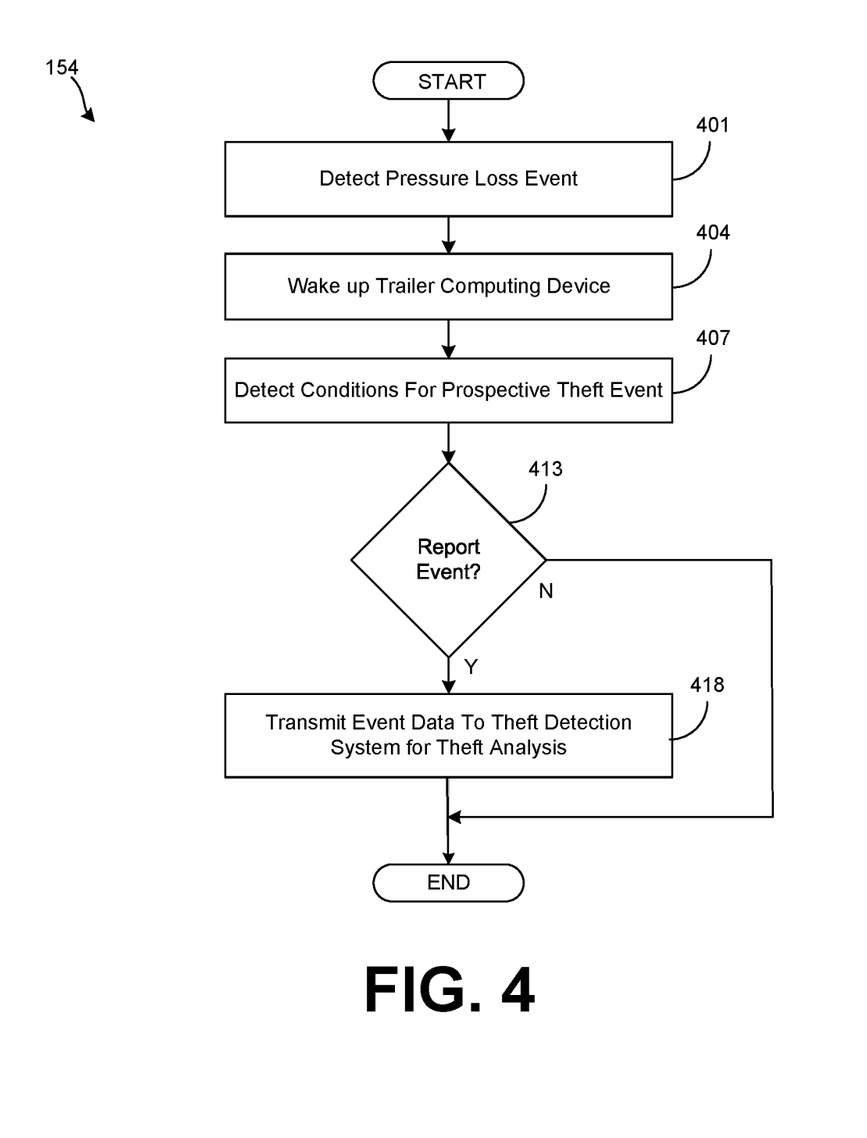
FIG. 4 is a flowchart illustrating one example of functionality implemented as portions of the trailer application executed in a computing environment in the networked environment of FIG. 1A according to various embodiments of the present disclosure.

Referring next to FIG. 4, shown is a flowchart that provides one example of the operation of a portion of the trailer application 154 according to various embodiments. It is understood that the flowchart of FIG. 4 provides merely an example of the many different types of functional arrangements that may be employed to implement the operation of the portion of the trailer application 154 as described herein. As an alternative, the flowchart of FIG. 4 may be viewed as depicting an example of elements of a method implemented in the computing environment 103 (FIG. 1) according to one or more embodiments.

Beginning with box 401, the trailer application 154 can detect a pressure loss event. The pressure loss event can include a rapid loss of pressure, a loss of data connection from the tire sensor 130 (e.g., TPMS) to the trailer computing device 109, and other suitable components. In some embodiments, the rapid loss of pressure is determined based at least in part whether it meets a pressure rate threshold in order to validate the rapid loss of pressure as a pressure loss event. The pressure rate threshold can be configured to distinguish a tire leak from a traditional puncture from a nail or metal object.

In box 404, the trailer application 154 can wake up or activate the trailer computing device 109 from a dormant state. The dormant state can represent an inactive state or a powered down mode. In some embodiments, the trailer computing device 109 does not need to be waken.

In box 407, the trailer application 154 can detect one or more conditions for analyzing whether the pressure loss event should be reported as a prospective theft event. Some examples of conditions that may be detected include a geographic location from the location device 151, a timestamp (e.g., date and time), a number of pressure loss events detected from multiple tires, present movement of the trailer 102, a time duration at the location, and other suitable conditions.

In box 413, the trailer application 154 can determine whether to report the pressure loss event as a prospective theft event based at least in part by analyzing the one or more conditions that have been collected. In some embodiments, certain conditions can be identified as high priority. For example, if one or more high priority conditions are true, then the trailer application 154 can report the theft event.

If the trailer application 154 determines to report the event, then the trailer application 154 can proceed to box 418. If the trailer application 154 determines not to report the event, then the trailer application 154 can proceed to the end or to a dormant state.

In box 418, the trailer application 154 can transmit the prospective theft event data to the theft detection system 115 for theft analysis. The prospective theft event data can include the pressure loss event data and the other conditions, such as the geographic location from the location device 151, a timestamp (e.g., date and time), a number of pressure loss events detected from multiple tires, the present movement of the trailer 102, a time duration at the location, and other suitable conditions. Then, the trailer application 154 can proceed to the end or to a dormant state.

Figure 5:
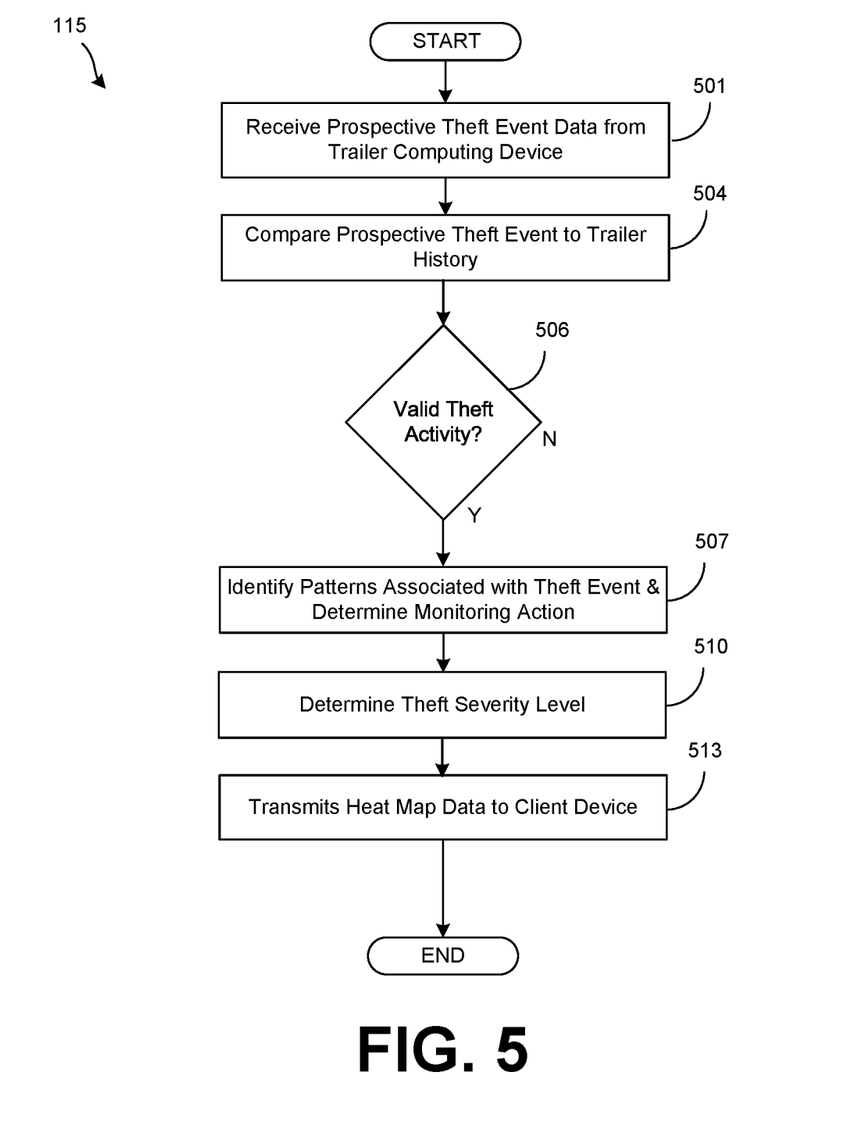
FIG. 5 is a flowchart illustrating one example of functionality implemented as portions of the theft detection system executed in a computing environment in the networked environment of FIG. 1A according to various embodiments of the present disclosure.

Referring next to FIG. 5, shown is a flowchart that provides one example of the operation of a portion of the theft detection system 115 according to various embodiments. It is understood that the flowchart of FIG. 5 provides merely an example of the many different types of functional arrangements that may be employed to implement the operation of the portion of the theft detection system 115 as described herein. As an alternative, the flowchart of FIG. 5 may be viewed as depicting an example of elements of a method implemented in the computing environment 103 (FIG. 1) according to one or more embodiments.

Beginning with box 501, the theft detection system 115 can receive prospective theft event data or theft event data from the trailer computing device 109. The prospective theft event data can include a unique identifier for the trailer 102 and/or the trailer computing device 109. In some instances, the theft detection system 115 can receive an alert first. In some embodiments, the trailer computing device 109 may be configured with the accelerometer 148 and in other designs the accelerometer 148 may be omitted.

In one example, with an accelerometer 148 omitted, the prospective theft data can include an indication of a pressure loss event, a location of the trailer computing device 109, a timestamp (e.g., day and time), and other suitable data. The pressure loss event may be associated with a pressure loss that meets a defined pressure loss threshold rate. In another instance, the pressure loss event can be identified for a data connection loss to the tire sensor 130 (e.g., detecting a removal of the tire sensor 130).

In another example, the accelerometer 148 is included in the trailer computing device 109. The prospective theft event data can include pressure measurements, temperature measurements, flag indicators, movement (e.g., acceleration) measurements, and other suitable data associated with a potential theft event.

In box 504, the theft detection system 115 can compare the prospective theft event data to a trailer history. The trailer history can be retrieved from a trailer computing device record 125 by using the unique identifier. For example, the prospective theft event data can include a location, a date, a time, sensor, and other suitable data. These data elements can be compared to normal events or measurements associated with the trailer 102, the geographic location, the trailer computing device 109, and other suitable items. In another example, the data elements of the prospective theft event data can be compared to a previous time period, such as twenty-four hours before the prospective theft event, seventy-two hours before the prospective theft event, a week before the prospective theft event, or some other suitable time period.

In box 506, the theft detection system 115 can determine if the prospective theft event is valid theft activity. If the prospective theft event is not valid theft activity, then the theft detection system 115 proceeds to the end. If the prospective theft event is valid theft activity, then the theft detection system 115 proceeds to box 507.

In box 507, the theft detection system 115 can identify one or more patterns associated with the prospective theft event. In some instances, the patterns can be identified based on a set of rules. For example, the reported prospective theft event can be a third reported theft event in the past month for a particular highway route. In another example, the theft detection system 115 can identify a pattern for a particular driver being associated with five prospective theft events in the state of Ohio. In another example, the theft detection system 115 can use a trained machine learning model from the machine learning service 118 to identify one or more patterns.

In some instances, the theft detection system 115 can determine a monitoring action for the trailer 102. Some examples of the monitoring action can include placing the trailer 102 on a watchlist, activating additional sensors 153 (e.g., motion sensors, microphones, cameras) associated with the trailer computing device 109, adjusting settings for the sensors 153, and other suitable security actions.

In box 510, the theft detection system 115 can determine a theft severity level for the theft event. For example, the theft severity level can involve classifying the theft event as one of multiple categories, such as a low level, medium level, and a high level. Each level can represent a degree of confidence of theft activity. Additionally, each level can be represented on the heat map (FIG. 2.). For example, a user interface element can be selected to display or omit each level of theft activity. Accordingly, a user can select a user interface element for a medium level and the heat map will display all on the medium level theft events over a geographic area (e.g., a city area, a state, a multi-state area, etc.). Next, the user can deselect the medium level and the medium level of theft events will be removed from the user interface.

In box 513, the theft detection system 115 can generate and transmit the heat map data to the client device 106. Then, the theft detection system 115 proceeds to the end.

Figure 6:
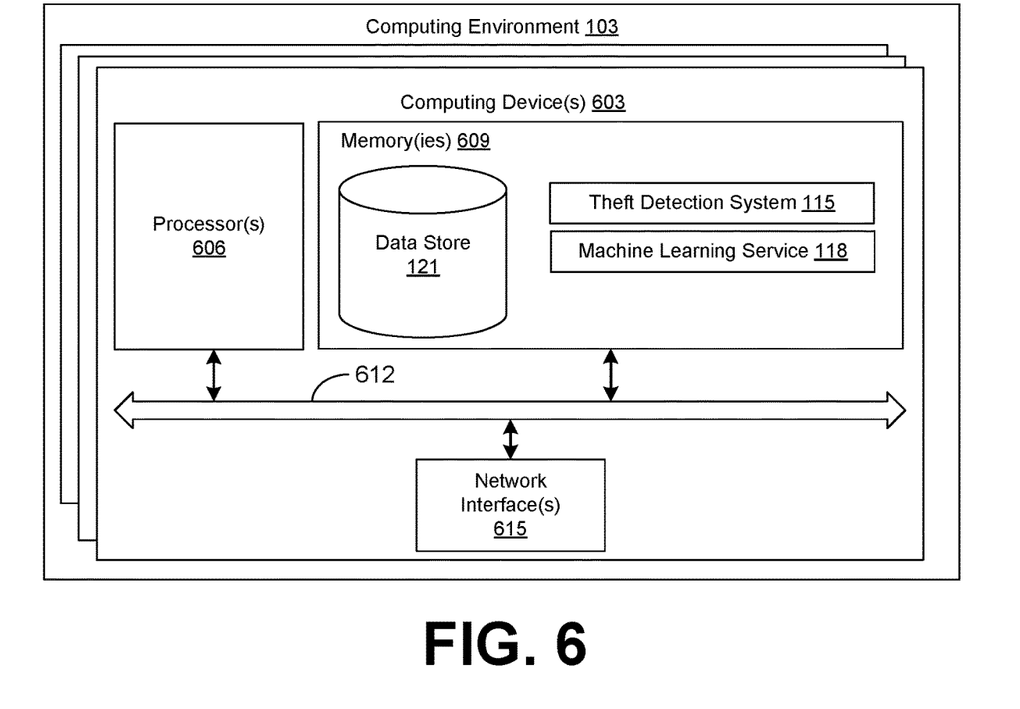
FIG. 6 is a schematic block diagram that provides one example illustration of a computing environment employed in the networked environment of FIG. 1A according to various embodiments of the present disclosure.

With reference to FIG. 6, shown is a schematic block diagram of the computing environment 103 according to an embodiment of the present disclosure. The computing environment 103 includes one or more computing devices 603. Each computing device 603 includes at least one processor circuit, for example, having a processor 606 and a memory 609, both of which are coupled to a local interface 612. To this end, each computing device 603 may comprise, for example, at least one server computer or like device. The local interface 612 may comprise, for example, a data bus with an accompanying address/control bus or other bus structure as can be appreciated. The local interface 612 may also be coupled to a network interface 615 for communicating with a network 112.

Stored in the memory 609 are both data and several components that are executable by the processor 606. In particular, stored in the memory 609 and executable by the processor 606 are theft detection system 115 and the machine learning service 118, and potentially other applications. Also stored in the memory 609 may be a data store 121 and other data. In addition, an operating system may be stored in the memory 609 and executable by the processor 606.

It is understood that there may be other applications that are stored in the memory 609 and are executable by the processor 606 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 609 and are executable by the processor 606. In this respect, the term "executable" means a program file that is in a form that can ultimately be run by the processor 606. Examples of executable programs may be, for example, a compiled program that can be translated into machine code in a format that can be loaded into a random access portion of the memory 609 and run by the processor 606, source code that may be expressed in proper format such as object code that is capable of being loaded into a random access portion of the memory 609 and executed by the processor 606, or source code that may be interpreted by another executable program to generate instructions in a random access portion of the memory 609 to be executed by the processor 606, etc. An executable program may be stored in any portion or component of the memory 609 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 609 is defined herein as including both volatile and nonvolatile memory and data storage components. Volatile components are those that do not retain data values upon loss of power. Nonvolatile components are those that retain data upon a loss of power. Thus, the memory 609 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 606 may represent multiple processors 606 and/or multiple processor cores and the memory 609 may represent multiple memories 609 that operate in parallel processing circuits, respectively. In such a case, the local interface 612 may be an appropriate network that facilitates communication between any two of the multiple processors 606, between any processor 606 and any of the memories 609, or between any two of the memories 609, etc. The local interface 612 may comprise additional systems designed to coordinate this communication, including, for example, performing load balancing. The processor 606 may be of electrical or of some other available construction.

Although the theft detection system 115 and the machine learning service 118, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-5 show the functionality and operation of an implementation of portions of the theft detection system 115, the machine learning service 118, and the client application 143. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 606 in a computer system or other system. The machine code may be converted from the source code, etc. If embodied in hardware, each block may represent a circuit or a number of interconnected circuits to implement the specified logical function(s).

Although the flowcharts of FIGS. 3-5 show a specific order of execution, it is understood that the order of execution may differ from that which is depicted. For example, the order of execution of two or more blocks may be scrambled relative to the order shown. Also, two or more blocks shown in succession in FIGS. FIGS. 3-5 may be executed concurrently or with partial concurrence. Further, in some embodiments, one or more of the blocks shown in FIGS. 3-5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the theft detection system 115, the machine learning service, 118, and the client application 143, that comprises software or code can be embodied in any non-transitory computer-readable medium for use by or in connection with an instruction execution system such as, for example, a processor 606 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the theft detection system 115, the machine learning service, 118, and the client application 143, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 603, or in multiple computing devices in the same computing environment 103. Additionally, it is understood that terms such as "application," "service," "system," "engine," "module," and so on may be interchangeable and are not intended to be limiting.

In the present disclosure, disjunctive language such as the phrase "at least one of X, Y, or Z," unless specifically stated otherwise, is otherwise understood with the context as used in general to present that an item, term, etc., may be either X, Y, or Z, or any combination thereof (e.g., X; Y; Z; X and/or Y; X and/or Z; Y and/or Z; X, Y, and/or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A vehicle trailer system, comprising:
a computing device attached to a trailer, the computing device comprising an accelerometer, a processor, and memory;
a tire sensor attached to a wheel of the trailer and in data communication with the computing device;
machine-readable instructions stored in the memory that, when executed by the processor, cause the computing device to at least:
detect an occurrence of an event, the event comprising at least one of a change in height to a portion of the trailer from an accelerometer of the computing device or a pressure loss event;
identify a vibration measurement from the accelerometer; and
transmit an indication of a theft event to a remote computing device, wherein the theft event includes a theft of at least one of a tire and a wheel associated with the trailer, and wherein transmitting the indication of the theft event further comprises determining whether there is an exception condition prior to transmitting the indication of the theft event.

2. The vehicle trailer system of claim 1, wherein determining the exception condition comprises identifying at least one of: a location of the trailer being located at a safe location, a movement of the trailer, or a predefined time window at the safe location.

3. The vehicle trailer system of claim 1, wherein the machine-readable instructions, when executed by the processor, cause the computing device to at least:
determine a theft type for the theft event based at least in part on a vibration signature identified in the vibration measurement from the accelerometer.

4. The vehicle trailer system of claim 3, wherein a vibration signature can represent a powered wrench tool, a crowbar, or a hydraulic jack.

5. The vehicle trailer system of claim 3, wherein the theft type for the theft event is determined based at least in part on detecting a sequence of a first vibration activity and a second vibration activity.

6. The vehicle trailer system of claim 1, wherein the computing device is attached to the trailer at a location that is closer to a front axle of the trailer than a back axle of the trailer.

7. A method, comprising:
detecting, by a trailer computing device that is attached to a trailer apparatus, an occurrence of an event, the event comprising at least one of a change in height to a portion of the trailer apparatus from an accelerometer of the trailer computing device or a pressure loss event;
identifying, by the accelerometer of the trailer computing device, a vibration measurement from the accelerometer; and
transmitting, by the trailer computing device, an indication of a theft event to a remote computing device, wherein the theft event includes a theft of at least one of a tire and a wheel associated with the trailer, and wherein transmitting the indication of the theft event further comprises determining whether there is an exception condition prior to transmitting the indication of the theft event.

8. The method of claim 7, wherein determining the exception condition comprises identifying at least one of: a location of the trailer apparatus being located at a safe location, a movement of the trailer apparatus, or a predefined time window at the safe location.

9. The method of claim 7, further comprising determining a theft type for the theft event based at least in part on a vibration signature identified in the vibration measurement from the accelerometer.

10. The method of claim 9, wherein the vibration signature can represent a powered wrench tool, a crowbar, or a hydraulic jack.

11. The method of claim 9, wherein the theft type for the theft event is determined based at least in part on detecting a sequence of a first vibration activity and a second vibration activity.

12. The method of claim 7, wherein the trailer computing device is mounted closer to a front axle of the trailer than a back axle of the trailer.

13. A system, comprising:
at least one computing device that comprises a processor and memory;
machine-readable instructions stored in the memory that, when executed by the processor, cause the at least one computing device to at least:
receive a prospective theft event from a trailer computing device, wherein the theft event includes a theft of at least one of a tire and a wheel associated with the trailer, and wherein the trailer computing device is attached to a trailer;
compare the prospective theft event to a trailer event history;
generate a heat map based at least in part on the comparison of the prospective theft event and the trailer event history; and
display the heat map on a client device, the heat map includes a representation of a geographic area, the heat map is configured to display a first interface layer of a first level of theft activity and a second interface layer of a second level of theft activity over the geographic area, each of the first interface layer and the second interface layer are configured to be displayed or omitted in response to a user selection, and wherein the theft activity includes a theft of at least one of a tire associated with the trailer, a wheel associated with the trailer, and the trailer.

14. The system of claim 13, wherein the machine-readable instructions stored in the memory that, when executed by the processor, cause the at least one computing device to at least:
identify a pattern associated with the prospective theft event based at least in part on the comparison of the prospective theft event to the trailer event history.

15. The system of claim 14, wherein the machine-readable instructions stored in the memory that, when executed by the processor, cause the at least one computing device to at least:
determine a monitoring action for the prospective theft event based at least in part on the pattern, the monitoring action for the prospective theft event being associated with at least one of: a truck driver, a truck route, or a geographic location associated with the trailer.

16. The system of claim 13, wherein the heat map includes a first user interface element and a second user interface element, the first user interface element being associated with the first interface layer of the first level of theft activity and the second user interface element being associated with the second level of theft activity.

17. The system of claim 13, wherein the machine-readable instructions stored in the memory that, when executed by the processor, cause the at least one computing device to at least:
determine a theft severity level for the prospective theft event based at least on part on the comparison of the prospective theft event to the trailer event history.

18. The system of claim 13, wherein comparing the prospective theft event to trailer event history further comprises checking for a theft exception condition associated with a condition of the prospective theft event.

* * * * *